Sept. 7, 1965  W. KAUFMANN ETAL  3,204,394
GUIDING AND RETARDING MEANS FOR GASEOUS STREAM
CONTAINING SOLID AND LIQUID CONSTITUENTS
TO BE SEPARATED THEREFROM
Filed April 7, 1960

United States Patent Office 3,204,394
Patented Sept. 7, 1965

3,204,394
GUIDING AND RETARDING MEANS FOR GASEOUS STREAM CONTAINING SOLID AND LIQUID CONSTITUENTS TO BE SEPARATED THEREFROM
Walter Kaufmann, Stauffacherstrasse 155, and Guido Dolder, Sonnenbergstrasse 5, both of Zurich, Switzerland
Filed Apr. 7, 1960, Ser. No. 20,782
Claims priority, application Switzerland, Apr. 9, 1959, 71,802
5 Claims. (Cl. 55—442)

The present invention relates to an apparatus for retarding a gaseous medium from which solid and liquid constituents are to be separated, the inlet cross-section for the medium to be treated being smaller than the cross-section of space provided for receiving a filtering means.

It is an object of the invention to attain retardation of the medium to be cleaned, so that it enters the filtering means at a velocity distributed as uniformly as possible, so that the constituents falling out before entry into the filtering means are continuously carried away, and so that the space required is reduced to a minimum.

According to the invention this object is achieved in that the filter is constructed in such a manner that the path taken by the medium from the filter inlet to the filtering means has two deflections which take place in two planes situated at right angles to each other, the first deflection amounting to 90°, and the second deflection through 180° taking place in a flow zone whose cross-section is gradually increasing.

Figure 1:
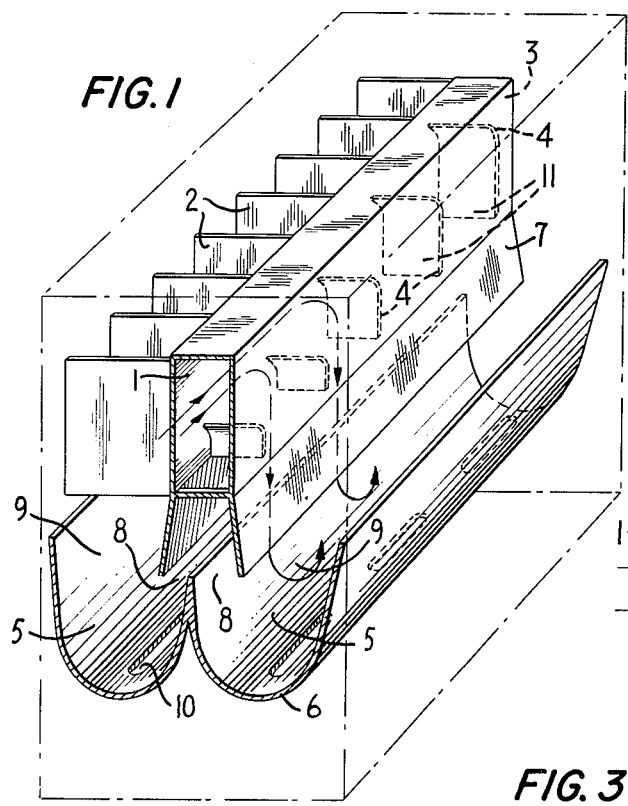
Figure 2:
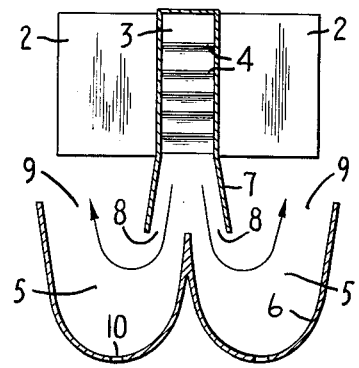
Figure 3:
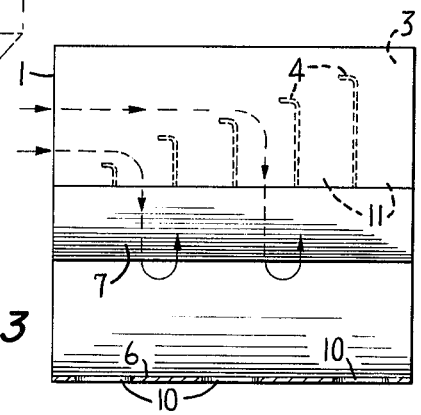
Figure 4:
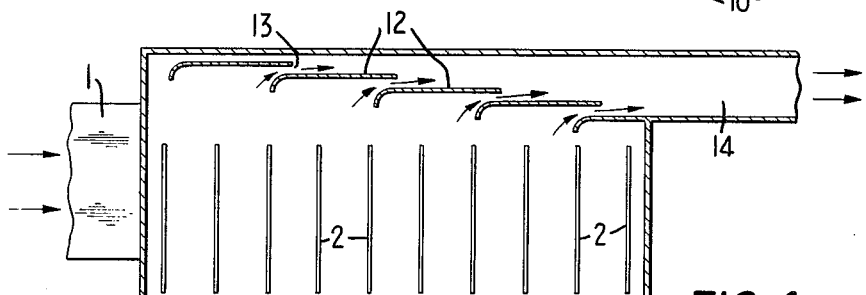
Figure 4:
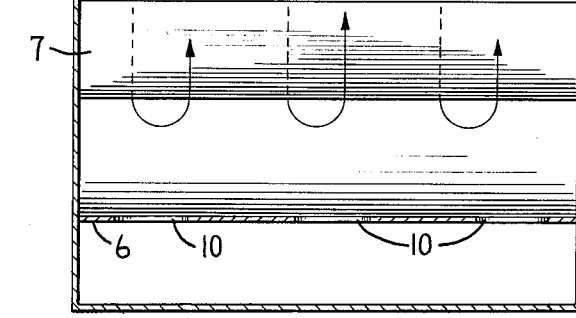

One embodiment of the invention is further explained with reference to the accompanying drawings, where:

FIG. 1 shows a perspective view of the arrangement situated in a filter casing (shown in dash-dotted lines) and intended for retarding the gas stream that is to be cleaned, FIG. 2 is a front view, FIG. 3 is a side view of this arrangement, and FIG. 4 is an additional arrangement, which serves to accelerate the cleaned gas stream after having passed through the filtering field.

In the following, a guiding and retarding system for use with an electro-filter for separating solid and liquid constituents from gaseous media is described, where the medium to be cleaned enters through the inlet 1 at a greater speed than that with which it passes through the filtering area 2. The path of the medium from the filter inlet 1 to the electric filtering area 2 has two deflections, which take place in two planes situated at right angles to each other. The first deflection amounts to 90° and is effected in a horizontal duct 3, in which a series of arcuate deflecting plates 4 are arranged for the purpose of deflecting the entering medium through 90° in layers.

The second deflection is effected through 180° in a flow zone whose cross-section gradually increases, i.e. in diffusor 5 which consists of an arcuate hollow 6 swept on one side by the flowing medium, and of a wall 7 projecting into the arcuate hollow, this wall 7 being swept by the flowing medium on one side at the diffusor inlet 8 and on the other side at the diffusor outlet 9. From the outlet 9 the medium passes into the filtering area 2.

The inlet and outlet directions of the diffusor are vertical. The outer wall 6 of the diffusor is provided with opening 10 through which very heavy constituents can fall by centrifugal force and by gravity.

It will be found advantageous, as illustrated, to provide two diffusors 5 in mirror image relationship whose inlet openings 8 are under the horizontal duct 3, out of which the medium issues vertically downwards through openings 11.

In the illustrated arrangement, the gas stream entering through the inlet 1 is retarded by being deflected in layers in the duct 3, since the sum of the cross-sections of the outlet openings 11 is greater than the inlet cross-section at 1. In the diffusor the flow is then further retarded and homogeneously, so that the velocity distribution is uniform at the inlet into an electric filtering area 2. Through the slits 10 the heavier constituents are continuously carried away. The arrangement shows a solution with which a considerable retardation of the gas flow can be attained, without any essential loss of pressure. On the contrary, some of the kinetic energy is recovered in the diffusor 5.

In order to maintain a steady flow in the diffusor 5, deflecting plates or guide plates can be built in.

The outer wall 6 of the diffusor may be constructed in several parts, at least one part being arranged on hinges to allow cleaning and inspecting.

The gas stream which flows vertically upwards at a minimum speed through the electric filtering field or area represented by plate electrodes 2 and is thereby cleaned, is deflected a third time after leaving this field, this deflection being again through 90°, whereby the gas stream is at the same time greatly accelerated. The deflecting and accelerating is effected with the least loss of pressure imaginable, since the deflecting is effected first of all at minimum speed, and in the neighborhood of the nozzle-shaped slits as accelerated flow. In FIG. 4 it can clearly be seen that, for attaining this effect, rectangularly bent, parallelly arranged pieces of sheet metal 12 are provided, which catch the cleaned gas stream rising out of the filtering field 2 and guide it into the nozzle-slits 13 formed by these pieces of sheet metal themselves. From there, the cleaned gas stream passes into the outlet duct 14, which has a smaller cross-section than the filtering field 2, so that the gas stream is accelerated when it issues from the filter.

The described devices for retarding and accelerating the flow of the medium may, of course, be also adopted in connection with other than electric filtering devices, for instance tube filters or filter mats or such like may be arranged in place of the electric filtering devices.

What we claim is:

1. Apparatus for removing solid and liquid particles from a flow of gas having means defining a first space for receiving said flow of gas and means defining a second space for purifying said gas flow by further removal of said particles, said first space having an inlet and an outlet having greater cross sectional area than said inlet, curved guide plates in said first space in the path of said gas flow for changing the direction of flow of said flow of gas through ninety degrees and in a direction for flowing out of said outlet, means to retard the gas flow leaving said first space and for effecting a substantially uniform velocity distribution cross sectionally in said gas flow and for reversing its direction of travel while retarding said gas flow and effecting said uniform velocity distribution comprsing a longitudinally extending diffusor for receiving the gas flow from said first space outlet and changing its path of flow and causing it to flow in a reverse direction into said second space, said diffusor being disposed in communication with said two spaces and having surfaces comprising side surfaces diverging in a direction in which said gas flows when leaving said first space outlet to effect retardation as said gas flow is received in said diffusor and other surfaces disposed diverging in a direction corresponding to said reverse direction for delivering said gas flow into said second space and for effecting further retardation of said gas flow immediately subsequent to reversal of direction of flow thereof, said diffusor surfaces comprising a surface configured to effect said reversal of direction of flow of said gas flow, and particle removal means in said second space.

2. Apparatus for removing solid and liquid particles from a flow of gas having means defining a first space for receiving said flow of gas and means defining a second space for purifying said gas flow by further removal of said particles, said first space having an inlet and an outlet having greater cross sectional area than said inlet, curved guide plates in said first space in the path of said gas flow for changing the direction of flow of said flow of gas through ninety degrees and in a direction for flowing out of said outlet, means to retard the gas flow leaving said first space and for effecting a substantially uniform velocity distribution cross sectionally in said gas flow and for reversing its direction of travel while retarding said gas flow and effecting said uniform velocity distribution comprising a longitudinally extending diffusor for receiving the gas flow from said first space outlet and changing its path of flow and causing it to flow in a reverse direction into said second space, said diffusor being disposed in communication with said two spaces and having surfaces comprising side surfaces diverging in a direction in which said gas flows when leaving said first space outlet to effect retardation as said gas flow is received in said diffusor and other surfaces disposed diverging in a direction corresponding to said reverse direction for delivering said gas flow into said second space and for effecting further retardation of said gas flow immediately subsequent to reversal of direction of flow thereof, said diffusor surfaces comprising a surface configured to effect said reversal of direction of flow of said gas flow, and electrostatic particle removal means in said second space.

3. Apparatus for removing solid and liquid particles from a flow of gas having means defining a first space for receiving said flow of gas and means defining a second space for purifying said gas flow by further removal of said particles, said first space having an inlet and an outlet having greater cross sectional area than said inlet, curved guide plates in said first space in the path of said gas flow for changing the direction of flow of said flow of gas through ninety degrees and in a direction for flowing out of said outlet, means to retard the gas flow leaving said first space and for effecting a substantially uniform velocity distribution cross sectionally in said gas flow and for reversing its direction of travel while retarding said gas flow and effecting said uniform velocity distribution comprising a longitudinally extending diffusor for receiving the gas flow from said first space outlet and changing its path of flow and causing it to flow in a reverse direction into said second space, said diffusor being disposed in communication with said two spaces and having surfaces comprising side surfaces diverging in a direction in which said gas flows when leaving said first space outlet to effect retardation as said gas flow is received in said diffusor and other surfaces disposed diverging in a direction corresponding to said reverse direction for delivering said gas flow into said second space and for effecting further retardation of said gas flow immediately subsequent to reversal of direction of flow thereof, said diffusor surfaces comprising a surface configured to effect said reversal of direction of flow of said gas flow, particle removal means in said second space, and said second space having an outlet and means for changing the direction of flow of said gas through ninety degrees while leaving said second space.

4. Apparatus for removing solid and liquid particles from a flow of gas having means defining a first space for receiving said flow of gas and means defining a second space for purifying said gas flow by further removal of said particles, said first space having an inlet and an outlet having greater cross sectional area than said inlet, curved guide plates in said first space in the path of said gas flow for changing the direction of flow of said flow of gas through ninety degrees and in a direction for flowing out of said outlet, means to retard the gas flow leaving said first space and for effecting a substantially uniform velocity distribution cross sectionally in said gas flow and for reversing its direction of travel while retarding said gas flow and effecting said uniform velocity distribution comprising a longitudinally extending diffusor for receiving the gas flow from said first space outlet and changing its path of flow and causing it to flow in a reverse direction into said second space, said diffusor being disposed in communication with said two spaces and having surfaces comprising side surfaces diverging in a direction in which said gas flows when leaving said first space outlet to effect retardation as said gas flow is received in said diffusor and other surfaces disposed diverging in a direction corresponding to said reverse direction for delivering said gas flow into said second space and for effecting retardation of said gas flow immediately subsequent to reversal of direction of flow thereof, said diffusor surfaces comprising a surface configured to effect said reversal of direction of flow of said gas flow, the last mentioned surface having spaced openings for removing particles therethrough when said reversal is effected, and particle removal means in said second space.

5. Apparatus for removing solid and liquid particles from a flow of gas having means defining a first space for receiving said flow of gas and means defining a second space for purifying said gas flow by further removal of said particles, said first space having an inlet and an outlet having greater cross sectional area than said inlet, curved guide plates in said first space in the path of said gas flow for changing the direction of flow of said flow of gas through ninety degrees and in a direction for flowing out of said outlet, means to retard the gas flow leaving said first space and for effecting a substantially uniform velocity distribution cross sectionally in said gas flow and for reversing its direction of travel while retarding said gas flow and effecting said uniform velocity distribution comprising a longitudinally extending diffusor for receiving the gas flow from said first space outlet and changing its path of flow and causing it to flow in a reverse direction into said second space, said diffusor being disposed in communication with said two spaces and having surfaces comprising side surfaces diverging in a direction in which said gas flows when leaving said first space outlet to effect retardation as said gas flow is received in said diffusor and other surfaces disposed diverging in a direction corresponding to said reverse direction for delivering gas flow into said second space and for effecting further retardation of said gas flow immediately subsequent to reversal of direction of flow thereof, said diffusor surfaces comprising an arcuate surface configured to effect said reversal of direction of flow of said gas flow, and particle removal means in said second space.

References Cited by the Examiner

UNITED STATES PATENTS

| | | |
|---|---|---|
| 1,007,289 | 10/11 | Jeffreys. |
| 1,633,602 | 6/27 | Nesbit. |
| 2,182,862 | 12/39 | Allardice. |
| 2,603,309 | 7/52 | Mercier et al. |
| 2,787,334 | 4/57 | Linderoth. |
| 2,983,333 | 5/61 | Percevaut. |

FOREIGN PATENTS

| | | |
|---|---|---|
| 870,549 | 3/53 | Germany. |

HARRY B. THORNTON, *Primary Examiner.*

HERBERT L. MARTIN, WALTER BERLOWITZ, WESLEY S. COLE, *Examiners.*